US011978265B2

(12) United States Patent
Szczerba et al.

(10) Patent No.: US 11,978,265 B2
(45) Date of Patent: May 7, 2024

(54) SYSTEM AND METHOD FOR PROVIDING LANE IDENTIFICATION ON AN AUGMENTED REALITY DISPLAY

(71) Applicant: GM Global Technology Operations LLC, Detroit, MI (US)

(72) Inventors: Joseph F. Szczerba, Grand Blanc, MI (US); John P. Weiss, Shelby Township, MI (US); Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 195 days.

(21) Appl. No.: 17/692,488

(22) Filed: Mar. 11, 2022

(65) Prior Publication Data

US 2023/0290156 A1 Sep. 14, 2023

(51) Int. Cl.
*G06V 20/58* (2022.01)
*B60K 35/00* (2024.01)
(Continued)

(52) U.S. Cl.
CPC ............ *G06V 20/582* (2022.01); *B60K 35/00* (2013.01); *G06T 7/70* (2017.01); *G06T 11/00* (2013.01); *G06V 40/18* (2022.01); *H04N 7/183* (2013.01); *B60K 35/23* (2024.01); *B60K 35/28* (2024.01); *B60K 35/65* (2024.01); *B60K 2360/166* (2024.01); *B60K 2360/168* (2024.01); *B60K 2360/177* (2024.01); *B60K 2360/31* (2024.01); *B60K 2360/741* (2024.01); *G06T 2207/30201* (2013.01); *G06T 2207/30256* (2013.01)

(58) Field of Classification Search
CPC ........ G06V 20/582; G06V 40/18; G06T 7/70; G06T 11/00; G06T 2207/30201; G06T 2207/30256; B60K 35/00; B60K 2370/1529; B60K 2370/177; B60K 2370/31; B60K 2370/166; B60K 2370/168; B60K 2370/741
See application file for complete search history.

(56) References Cited

U.S. PATENT DOCUMENTS 6,360,168 B1 * 3/2002 Shimabara ......... G01C 21/3638
701/436
10,217,357 B1 * 2/2019 Elsheemy .......... G08G 1/09623
(Continued)

*Primary Examiner* — Brian P Yenke
(74) *Attorney, Agent, or Firm* — Vivacqua Crane, PLLC

(57) ABSTRACT

A method for displaying lane information on an augmented reality display includes receiving roadway data. The roadway data includes information about a roadway along a route of a vehicle. The roadway includes a plurality of lanes. The roadway data includes lane information about at least one of the plurality of lanes along the route of the vehicle. The method further includes receiving vehicle-location data. The vehicle-location data indicates a location of the vehicle. The method further includes determining that that the vehicle is approaching a road junction using the vehicle-location data and the roadway data. The method further includes, in response to determining that the vehicle is approaching the road junction, transmitting a command signal to a dual-focal plane augmented reality display to display at least one virtual image that is indicative of the lane information.

19 Claims, 5 Drawing Sheets

(51) Int. Cl.
  *B60K 35/23* (2024.01)
  *B60K 35/28* (2024.01)
  *G06T 7/70* (2017.01)
  *G06T 11/00* (2006.01)
  *G06V 40/18* (2022.01)
  *H04N 7/18* (2006.01)
  *B60K 35/65* (2024.01)

(56) References Cited

U.S. PATENT DOCUMENTS

| | | | | |
|---|---|---|---|---|
| 10,338,383 | B2* | 7/2019 | Ieda | G08G 1/0967 |
| 10,633,003 | B1* | 4/2020 | Abundis Vargas | H04W 4/027 |
| 11,022,458 | B2* | 6/2021 | Koh | G01C 21/3658 |
| 11,067,995 | B2* | 7/2021 | Weiser | G05D 1/0214 |
| 11,169,377 | B1* | 11/2021 | Chen | G02B 27/0101 |
| 11,184,079 | B2* | 11/2021 | Shealy | H03H 3/02 |
| 11,605,233 | B2* | 3/2023 | Stenneth | G06V 10/993 |
| 11,699,250 | B1* | 7/2023 | McCann | B60K 35/00 |
| | | | | 345/628 |
| 11,798,240 | B2* | 10/2023 | Szczerba | G06T 19/006 |
| 2010/0253489 | A1* | 10/2010 | Cui | G08G 1/165 |
| | | | | 340/425.5 |
| 2010/0253492 | A1* | 10/2010 | Seder | G01S 13/931 |
| | | | | 348/148 |
| 2010/0253539 | A1* | 10/2010 | Seder | G01C 21/365 |
| | | | | 340/902 |
| 2010/0253943 | A1* | 10/2010 | Fu | G01N 15/0205 |
| | | | | 356/335 |
| 2016/0252363 | A1* | 9/2016 | Tertoolen | G01C 21/367 |
| | | | | 701/410 |
| 2016/0305787 | A1* | 10/2016 | Sato | G08G 1/096844 |
| 2016/0328968 | A1* | 11/2016 | Elsheemy | G08G 1/0962 |
| 2017/0103272 | A1* | 4/2017 | Satomura | B60Q 9/00 |
| 2018/0031384 | A1* | 2/2018 | Lee | G01C 21/365 |
| 2018/0066956 | A1* | 3/2018 | Kim | G06F 16/29 |
| 2018/0068559 | A1* | 3/2018 | Bjersing | G08G 1/09675 |
| 2018/0174368 | A1* | 6/2018 | Nix | G06T 19/006 |
| 2018/0218603 | A1* | 8/2018 | Torii | G01C 21/365 |
| 2019/0080496 | A1* | 3/2019 | Wakatsuki | G02B 27/01 |
| 2019/0180485 | A1* | 6/2019 | Kim | G01C 21/3602 |
| 2020/0031227 | A1* | 1/2020 | Irie | G08G 1/167 |
| 2020/0064138 | A1* | 2/2020 | Takahama | G01C 21/3667 |
| 2020/0086888 | A1* | 3/2020 | Engle | B60K 35/00 |
| 2020/0180612 | A1* | 6/2020 | Finelt | G05D 1/0088 |
| 2020/0254875 | A1* | 8/2020 | Strandberg | B60K 37/06 |
| 2020/0292832 | A1* | 9/2020 | Liu | G06V 40/18 |
| 2021/0104212 | A1* | 4/2021 | Horihata | G09G 5/377 |
| 2021/0223058 | A1* | 7/2021 | Horihata | G01C 21/3635 |
| 2021/0372803 | A1* | 12/2021 | van der Vlist | G01C 21/3635 |
| 2022/0084458 | A1* | 3/2022 | Sakuma | G09G 3/2096 |
| 2022/0172652 | A1* | 6/2022 | Yagyu | G08G 1/16 |
| 2022/0289228 | A1* | 9/2022 | Yamamoto | B60K 35/00 |
| 2022/0314886 | A1* | 10/2022 | Oigawa | B60K 35/00 |
| 2022/0349725 | A1* | 11/2022 | Chreptyk | G01C 21/387 |
| 2022/0383556 | A1* | 12/2022 | Choi | G06T 7/30 |
| 2023/0073664 | A1* | 3/2023 | Mao | G02B 27/286 |
| 2023/0242137 | A1* | 8/2023 | Yorifuji | B60W 40/08 |
| | | | | 701/1 |
| 2023/0298277 | A1* | 9/2023 | Szczerba | G06F 3/013 |
| | | | | 345/633 |
| 2023/0306692 | A1* | 9/2023 | Szczerba | G06Q 50/01 |
| | | | | 345/633 |
| 2023/0306850 | A1* | 9/2023 | Szczerba | G06V 20/58 |
| | | | | 345/633 |
| 2023/0316914 | A1* | 10/2023 | McLaine | G02B 27/0101 |
| | | | | 701/117 |

* cited by examiner

SYSTEM AND METHOD FOR PROVIDING LANE IDENTIFICATION ON AN AUGMENTED REALITY DISPLAY

INTRODUCTION

The present disclosure relates to a system and method for displaying lane information on an augmented reality display.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles include displays to provide information to a vehicle user. However, these displays do not necessarily present lane information relating to lane usage. Providing lane usage information may help the vehicle user select a lane while driving. It is therefore desirable to develop a system and a method for displaying lane information on an augmented reality display based on real-time vehicle positioning within the current driving environment.

SUMMARY

The present disclosure describes a system and method that uses an augmented reality display, which may be configured as a HUD or an information cluster display. The augmented reality display employs conformal graphics overlaid on the roadway to show identification and/or rule information about the driving lanes. The spatially placed labels registered to the roadway lanes describe the purpose of each lane and/or roadway rules associated with the particular lane. The system activates on demand, in poor driving conditions, and when the vehicle is approaching a multiple-lane intersection. The presently disclosed method and system uses roadway markers, vehicle sensors, and driving head and eye position to calculate and adjust the location of the projected conformal graphics overlaid on the roadway in real-time. In addition, the presently disclosed method and system provides awareness in automated driving modes to increase user trust and aid in vehicle take-over.

In an aspect of the present disclosure, the method for displaying lane information on an augmented reality display includes receiving roadway data. The roadway data includes information about a roadway along a route of a vehicle. The roadway includes a plurality of lanes. The roadway data includes lane information about at least one of the plurality of lanes along the route of the vehicle. The method further includes receiving vehicle-location data. The vehicle-location data indicates a location of the vehicle. The method further includes determining that that the vehicle is approaching a road junction using the vehicle-location data and the roadway data. The method further includes, in response to determining that the vehicle is approaching the road junction, transmitting a command signal to a dual-focal plane augmented reality display to display at least one virtual image that is indicative of the lane information about at least one of the plurality of lanes along the route of the vehicle as the vehicle is approaching the road junction. The method described in this paragraph improves vehicle technology by providing a vehicle user with lane information when the vehicle approaches a road junction or when the visibility is poor.

In an aspect of the present disclosure, the method further includes identifying lane markers of the plurality of lanes.

In an aspect of the present disclosure, the method further includes determining a position of the vehicle relative to the plurality of lanes of the roadway along the route.

In an aspect of the present disclosure, the method further includes determining virtual images to be displayed on the dual-focal plane augmented reality display based on the lane information.

In an aspect of the present disclosure, the method further includes determining a location of eyes of a user of the vehicle.

In an aspect of the present disclosure, the method further includes determining a location of at least one virtual image on the dual-focal plane augmented reality display based on the location of the eyes of the user of the vehicle.

In an aspect of the present disclosure, the method further includes commanding the dual-focal plane augmented reality display to display at least one virtual image at the location previously determined. The virtual image includes the lane information of at least one of the plurality of lanes along the route of the vehicle as the vehicle is approaching the road junction.

In an aspect of the present disclosure, the method further includes determining whether the vehicle has passed the road junction. The method includes ending the method in response to determining that the vehicle has passed the road junction.

In an aspect of the present disclosure, the method further includes receiving image data. The image data includes information about a visibility of the roadway along the route of the vehicle. The method further includes determining that the visibility of a road sign along the route of the vehicle is less than a predetermined minimum-confidence threshold using the image data. The method further includes, in response to determining that the visibility of the road sign along the roadway of the vehicle is less than the predetermined minimum-confidence threshold, transmitting a command signal to a dual-focal plane augmented reality display to display at least one virtual image including the lane information of each of the plurality of lanes along the route of the vehicle as the vehicle is approaching the road junction.

In an aspect of the present disclosure, a method for displaying lane information on an augmented reality display includes receiving roadway data. The roadway data includes information about a roadway along a route of a vehicle. The roadway includes a plurality of lanes. The roadway data includes lane information about each of the plurality of lanes along the route of the vehicle. The method further includes receiving image data. The image data includes information about a visibility of the road along the route of the vehicle. The method further includes determining that a visibility of a road sign along the route of the vehicle is less than a predetermined minimum-confidence threshold using the image data. The method further includes, in response to determining that the visibility of the road sign along the road of the vehicle is less than the predetermined minimum-confidence threshold, transmitting a command signal to a dual-focal plane augmented reality display to display at least one virtual image including lane information of at least one of the plurality of lanes along the route of the vehicle as the vehicle is approaching a road junction. The method described in this paragraph improves vehicle technology by providing a vehicle user with lane information when the visibility is poor.

In an aspect of the present disclosure, the method further includes identifying lane markers of the plurality of lanes.

In an aspect of the present disclosure, the method further includes determining a position of the vehicle relative to the plurality of lanes of the roadway along the route.

In an aspect of the present disclosure, the method further includes determining at least one virtual image to be displayed on the dual-focal plane augmented reality display based on the lane information.

In an aspect of the present disclosure, the method further includes determining a location of eyes of a user of the vehicle.

In an aspect of the present disclosure, the method further includes determining a location of at least one virtual image on the dual-focal plane augmented reality display based on the location of the eyes of the user of the vehicle.

In an aspect of the present disclosure, a system for displaying lane information on an augmented reality display in a vehicle includes a plurality of sensors. At least one of the plurality of sensors is configured to collect roadway data. The roadway data includes information about a roadway along a route of the vehicle. The roadway includes a plurality of lanes. The roadway data further includes lane information about each of the plurality of lanes along the route of the vehicle. The system further includes a dual-focal plane augmented reality display and a controller in communication with the plurality of sensors and the dual-focal plane augmented reality display. The controller is configured to receive the roadway data from at least one of the plurality of sensors and receive vehicle-location data from at least one of the plurality of sensors. The vehicle-location data indicates a location of the vehicle. The controller is configured to: determine that that the vehicle is approaching a road junction using the roadway data and the vehicle-location data; and in response to determining that the vehicle is approaching the road junction, transmit a command signal to a dual-focal plane augmented reality display to display at least one virtual image including the lane information of each of the plurality of lanes along the route of the vehicle as the vehicle is approaching the road junction. The system described in this paragraph improves vehicle technology by providing a vehicle user with lane information when the vehicle approaches a road junction or when the visibility is poor.

In an aspect of the present disclosure, the plurality of sensors includes a camera. The controller is further configured to identify lane markers of the plurality of lanes based on an input from the camera.

In an aspect of the present disclosure, the controller is configured to determine a position of the vehicle relative to the plurality of lanes of the roadway along the route.

In an aspect of the present disclosure, the controller is further configured to determine at least one virtual image to be displayed on the dual-focal plane augmented reality display based on the lane information.

In an aspect of the present disclosure, the plurality of sensors includes a user tracker. The controller is further configured to determine a location of eyes of a user of the vehicle using an input from the user tracker. The controller is configured to determine a location of at least one virtual image on the dual-focal plane augmented reality display based on the location of the eyes of the user of the vehicle.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
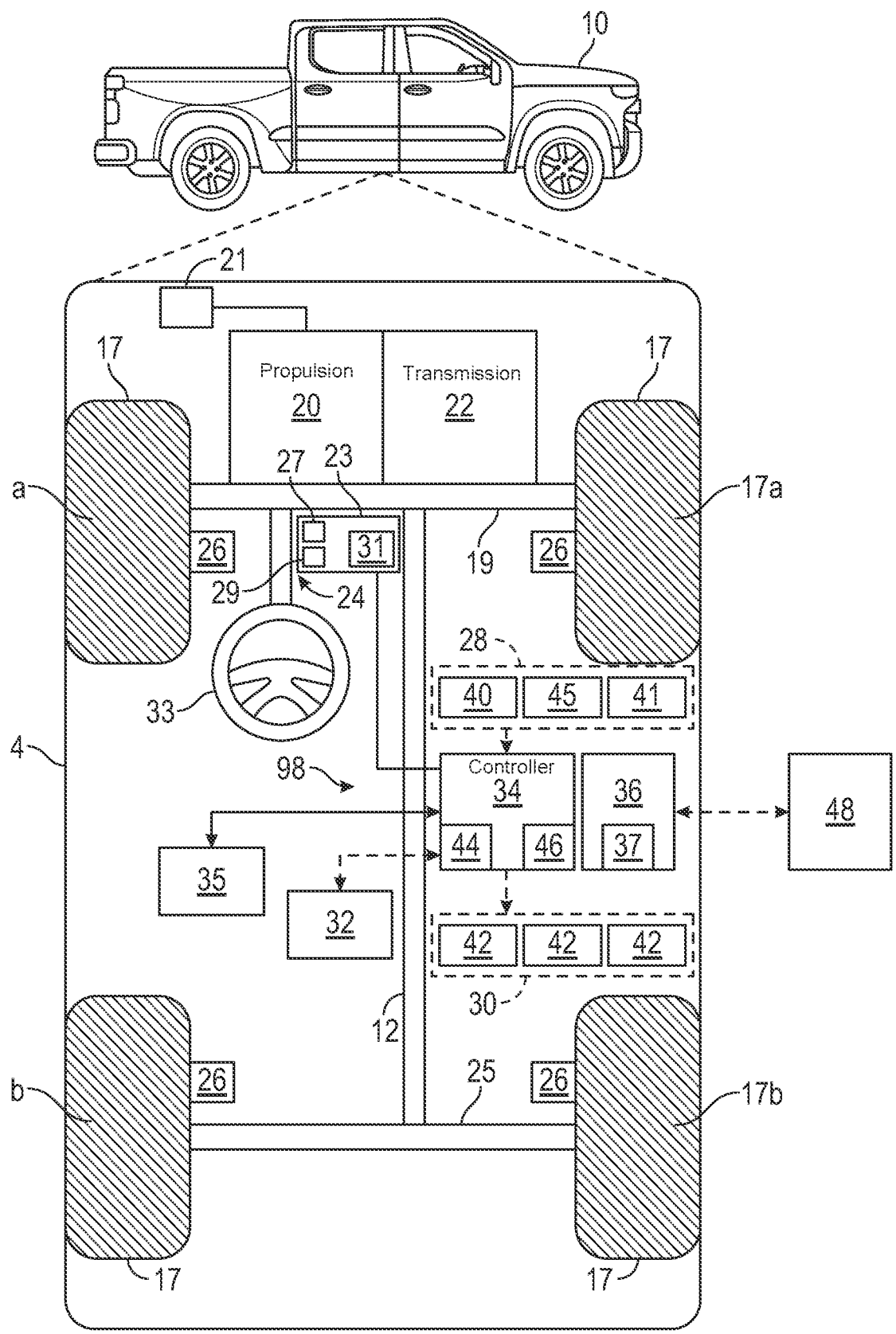
FIG. 1 is a block diagram depicting an embodiment of a vehicle including a system for displaying lane information on an augmented reality display.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a chassis 12, a body 14, front and rear wheels 17 and may be referred to as a vehicle system. In the depicted embodiment, the vehicle 10 includes two front wheels 17*a* and two rear wheels 17*b*. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17*a* and a rear axle 25 coupled to the rear wheels 17*b*.

In various embodiments, the vehicle 10 may be an autonomous vehicle and a control system 98 is incorporated into the vehicle 10. The control system 98 may be referred to as the system or the system for displaying lane information on a display 29. The vehicle 10 is, for example, a vehicle that is automatically controlled to carry passengers from one location to another. The vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the vehicle 10 may be a so-called a Level Two, a Level Three, Level Four, or Level Five automation system. A Level Four system indicates "high automation," referring to the driving modespecific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more radars, one or more light detection and ranging (lidar) sensors, one or more proximity sensors, one or more odometers, one or more ground penetrating radar (GPR) sensors, one or more steering angle sensors, one or more global positioning systems (GPS) transceivers 45, one or more tire pressure sensors, one or more cameras 41 (e.g., optical cameras and/or infrared cameras), one or more gyroscopes, one or more accelerometers, one or more inclinometers, one or more speed sensors, one or more ultrasonic sensors, one or more inertial measurement units (IMUs) and/or other sensors. Each sensor 40 is configured to generate a signal that is indicative of the sensed observable conditions of the exterior environment and/or the interior environment of the vehicle 10. Because the sensor system 28 provides data to the controller 34, the sensor system 28 and its sensors 40 are considered sources of information (or simply sources).

The sensor system 28 includes one or more Global Navigation Satellite System (GNSS) transceivers 45 (e.g., Global Positioning System (GPS) transceivers) configured to detect and monitor the route data (i.e., route information). The GNSS transceiver 45 is considered one of the sensors 40 and is configured to communicate with a GNSS to locate the position of the vehicle 10 in the globe. The GNSS transceiver 45 is in electronic communication with the controller 34.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The vehicle 10 may further include one or more airbags 35 in communication with the controller 34 or another controller of the vehicle 10. The airbag 35 includes an inflatable bladder and is configured to transition between a stowed configuration and a deployed configuration to cushion the effects of an external force applied to the vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may programmed to execute a method 100 (FIG. 7) for displaying lane information on AR display as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 98. The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the vehicle 10. The user interface 23 is in electronic communication with the controller 34 and is configured to receive inputs by a user (e.g., a vehicle operator or a vehicle passenger). For example, the user interface 23 may include a touch screen and/or buttons configured to receive inputs from a vehicle user. Accordingly, the controller 34 is configured to receive inputs from the user via the user interface 23.

The display 29 is configured to display information to the user (e.g., vehicle operator or passenger) and may be an augmented reality (AR) display. In the present disclosure, the term "AR display" means a display that presents information to users, while still allowing sight of the outside world. In certain embodiments, the display 29 may be configured as a heads-up display (HUD), and/or an information cluster display. Accordingly, the display 29 may be an AR HUD or an AR information cluster display. In an AR HUD, images are projected on a windshield 39 (FIG. 6) of the vehicle 10. In an AR information cluster display, the information cluster panel of the vehicle 10 includes a screen that presents an image of the front of the vehicle 10 captured by one or more cameras 41 (i.e., a forward image) and virtual images presented on that forward image. As discussed below, the display 29 may be a dual-focal plane AR display.

The communication system 36 is in communication with the controller 34 and is configured to wirelessly communicate information to and from other entities 48, such as but not limited to, other vehicles ("V2V" communication), infrastructure ("V2I" communication), remote systems at a remote call center (e.g., ON-STAR by GENERAL MOTORS) and/or personal devices. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the vehicle 10 and another vehicle. Further, the communication system 36 is configured to wirelessly communicate information between the vehicle 10 and infrastructure or other vehicles.

Figure 2:
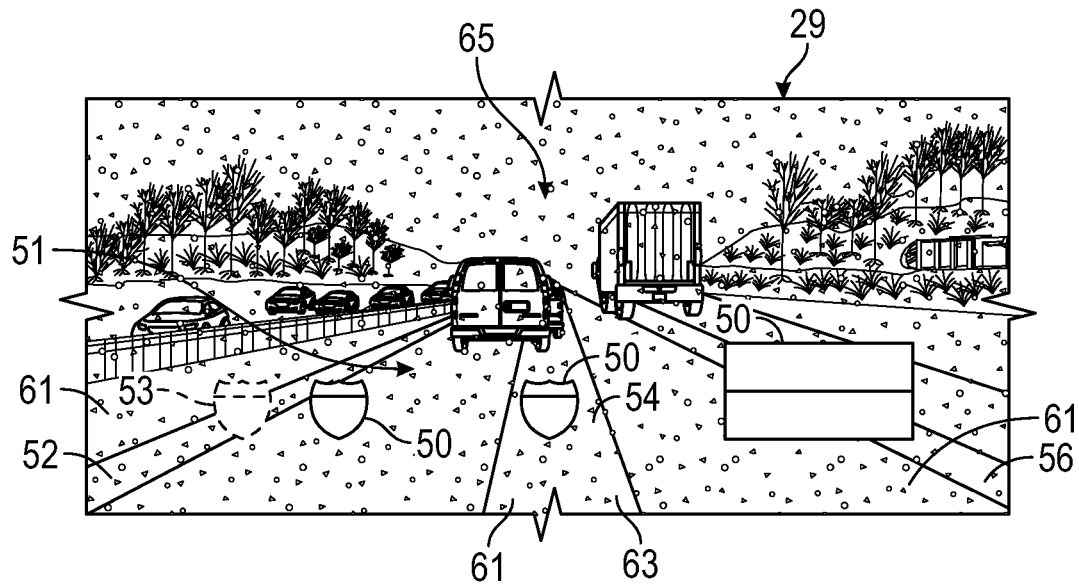
FIG. 2 is a schematic front view of the dual-focal plane augmented reality display of FIG. 1, wherein the dual-focal plane augmented reality display is configured as a head-up display (HUD) and shows lane identification information.
Figure 3:
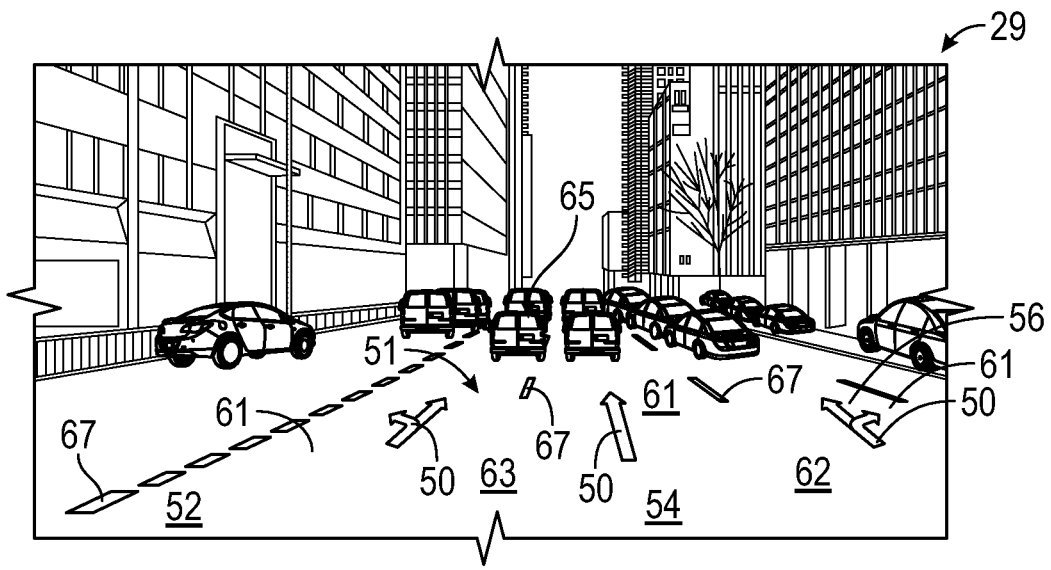
FIG. 3 is a schematic front view of the dual-focal plane augmented reality display of FIG. 1, wherein the dual-focal plane augmented reality display is configured as a HUD and shows lane rule information.

With reference to FIGS. 1, 2, and 3, the system 98 is configured to command the display 29, such as an AR HUD or an AR information cluster display, to show lane information (e.g., lane identification, lane purpose, and/or lane rules) using data received from the sensors 40 in the vehicle 10, data received from other entities 48 through the communication system 36, and/or eye-tracking data. In doing so, the display 29 shows the lane information in a contextual manner by augmenting the road scene with conformal graphics. In the present disclosure, the term "conformal graphic" means syntenic generated content (i.e., a virtual image 50) presented as part of the outside world. Accordingly, the display 29 is conformal display. In the present disclosure, the term "conformal display" means a display that has the ability to represent synthetically generated content (i.e., one or more virtual images 50) as part of the outside world.

In FIG. 2, the display 29 shows virtual images 50 with lane identification information as part of the outside world. FIG. 2 therefore shows a view of a roadway 63 through a windshield 39 (FIG. 6) in addition to the virtual images 50 or an image of the roadway 63 with the virtual images 50. In the present disclosure, the term "roadway" means an open way for vehicles 10. As a non-limiting example, in FIG. 2, the virtual images 50 identifies the lanes 61 with the number or name of the interstates or street where lane would to. Specifically, a left lane 52 would lead to interstate 94, whereas a central lane 54 would lead to interstate 75. A right lane 56 would lead to an exit to main street. The virtual image 50 on the right lane 56 also indicates a rule for that lane (i.e., that a vehicle 10 may only exit the expressway using that far-right lane). As discussed below, these virtual images 50 are particularly helpful in situations of poor visibility. In the present disclosure, the term "central lane" means the lane where the vehicle 10 is currently positioned. As used herein, the term "right lane" means the lane directly to the right of the central lane, and the term "left lane" means the lane directly to the left of the central lane. Because the roadway 64 leads to other roads (e.g., streets, interstate, and/or exits), this portion of the road is considered a road junction 65. As used herein, the term "road junction" means a point in the roadway 63 where two or more roads meet. For example, the road junction 65 may be an intersection or an interchange. At interchanges, roads pass above or below each other, using grade separation and slip roads. At intersections, roads cross at-grade.

In FIG. 3, the display 29 shows virtual images 50 with lane rule information as part of the outside world. As a non-limiting example, in FIG. 3, the virtual images 50 provide the user with information about the rules for each particular lane and therefore are shaped as arrows. Specifically, the vehicle 10 may turn left from the left lane 52 or keep straight in the left lane 52. The vehicle 10 may only continue forward (i.e., it cannot turn) while traveling on the central lane 54, and the vehicle 10 may turn right from the right lane 54 or keep straight in the right lane 56.

Figure 4:
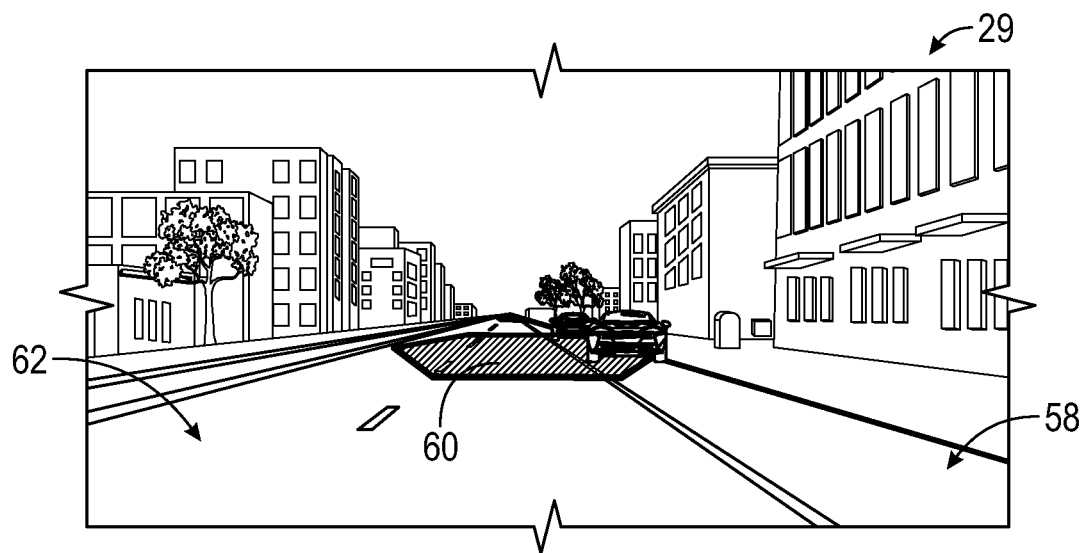
FIG. 4 is a schematic front view of the dual-focal plane augmented reality display of FIG. 1, highlighting a second image plane of the dual-focal plane augmented reality display of FIG. 1.
Figure 5:
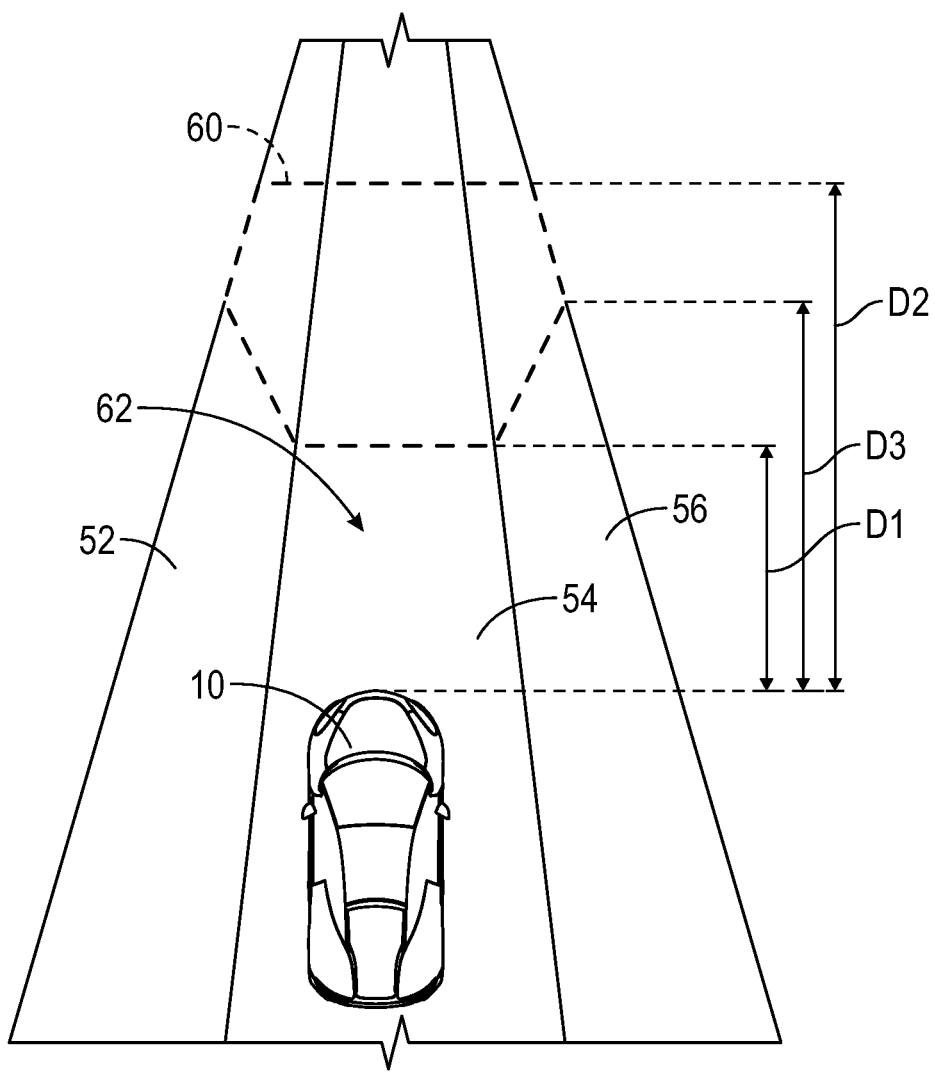
FIG. 5 is a schematic diagram of the second image plane of the dual-focal plane augmented reality display of FIG. 1.

With reference to FIGS. 4 and 5, the display 29 may be a dual-focal plane AR display as mentioned above. In this case, the display 29 has a first image plane 58 and a second image plane 60. The first image plane 58 shows the view of the outside world, and the second image plane 60 is reserved for displaying the virtual images 50 (FIG. 2). The second image plane 60 spans multiple lanes and the virtual images 50 appear at a location farther on the roadway surface 62 relative to the first image plane 58. For instance, as shown in FIG. 5, the second image plane 60 covers the left lane 52, the central lane 54, and the right lane 56. As a non-limiting example, in the central lane 54, the second image plane 60 starts at a first predetermined distance D1 (e.g., twenty-five meters) from the vehicle 10 and ends at a second predetermined distance D2 (e.g., ninety meters) from the vehicle 10. Regardless of the specific distances, the second predetermined distance D2 is greater than the first predetermined distance D1 to help the vehicle user see the virtual images 50 (FIG. 2). In the left lane 52 and the right lane 56, the second image plane 60 is delimited by a sloped boundary that starts at the first predetermined distance D1 from the vehicle 10 and ends at a third predetermined distance D3 (e.g., fifty meters) from the vehicle 10. The third predetermined distance D3 is greater than the first predetermined distance D1 and less than the second predetermined distance D2 to help the vehicle user see the virtual images 50 (FIG. 2). As used herein, the term "dual-focal plane AR display" means an AR display that presents images in a first image plane and a second image plane, wherein the first image plane and the second image plane are at different locations. It is desirable to configure the display 29 as a dual-focal plane AR display to facilitate manipulation of the virtual images 50 on the view of the outside word. For instance, by using a dual-focal plane AR display, the size, location, and characteristics of the virtual images 50 may be changed based on, for example, the location of the eyes of the vehicle user.

Figure 6:
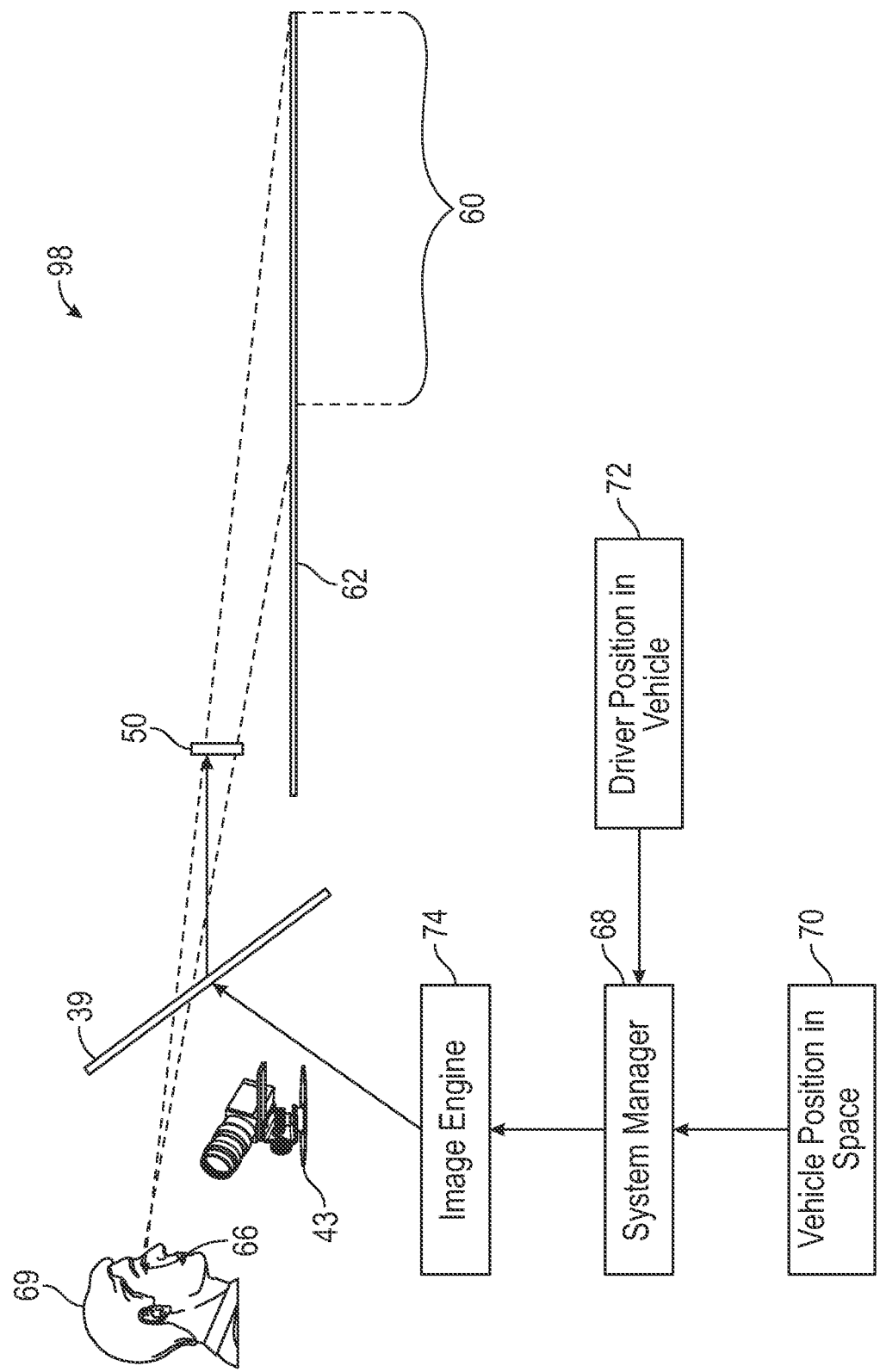
FIG. 6 is a schematic diagram of part of the system for displaying lane information on the dual-focal plane augmented reality display of FIG. 1.

With reference to FIG. 6, the system 98 includes a user tracker 43 (e.g., eye tracker and/or head tracker) configured to track the position and movement of the eyes 66 or the head 69 of the vehicle user. In the depicted embodiment, the user tracker may be configured as one or more of cameras 41 of the vehicle 10. As discussed above, the cameras 41 are considered sensors 40 of the vehicle 10. As a sensor 40, the user tracker 43 is in communication with the controller 34, which includes a system manager 68. During operation of the system 98, the system manager 68 receives at least a first input 70 and a second input 72. The first input 70 is indicative of the position of the vehicle in space (i.e., the vehicle location in space), and the second input 72 is indicative of the vehicle user position in the vehicle 10 (e.g., the position of the eyes and/or head of the user in the vehicle 10). The first input 70 may include data such as GNSS data (e.g., GPS data), vehicle speed roadway curvature, and vehicle steering, and this data may be collected from the sensors 40 of the vehicle 10 and/or other entities 48 through the communication system 36 of the vehicle 10. The second input 72 may be received from the user tracker (e.g., eye tracker and/or head tracker). The system manager 68 is configured to determine (e.g., compute) the type, size, shape, and color of the conformal graphics (i.e., virtual images 50) based on the first input 70 (i.e., the vehicle location in space), the second input 72 (e.g., the position of the eyes and/or head of the user in the vehicle 10), and the sensed vehicle driving environment (which may be obtained through the sensors 40). The type, size, shape, and color of the conformal graphics of the virtual image 50 may be collectively referred to as the virtual image characteristics.

With continued reference to FIG. 6, the system 98 further includes an image engine 74, which is part of the display 29, and may be an integrated circuit configured to generate the virtual images 50. These generated virtual images 50 are then projected on the windshield 39 (if the display 29 is a HUD) to show the virtual images 50 on the second image plane 60 along the roadway surface 62.

Figure 7:
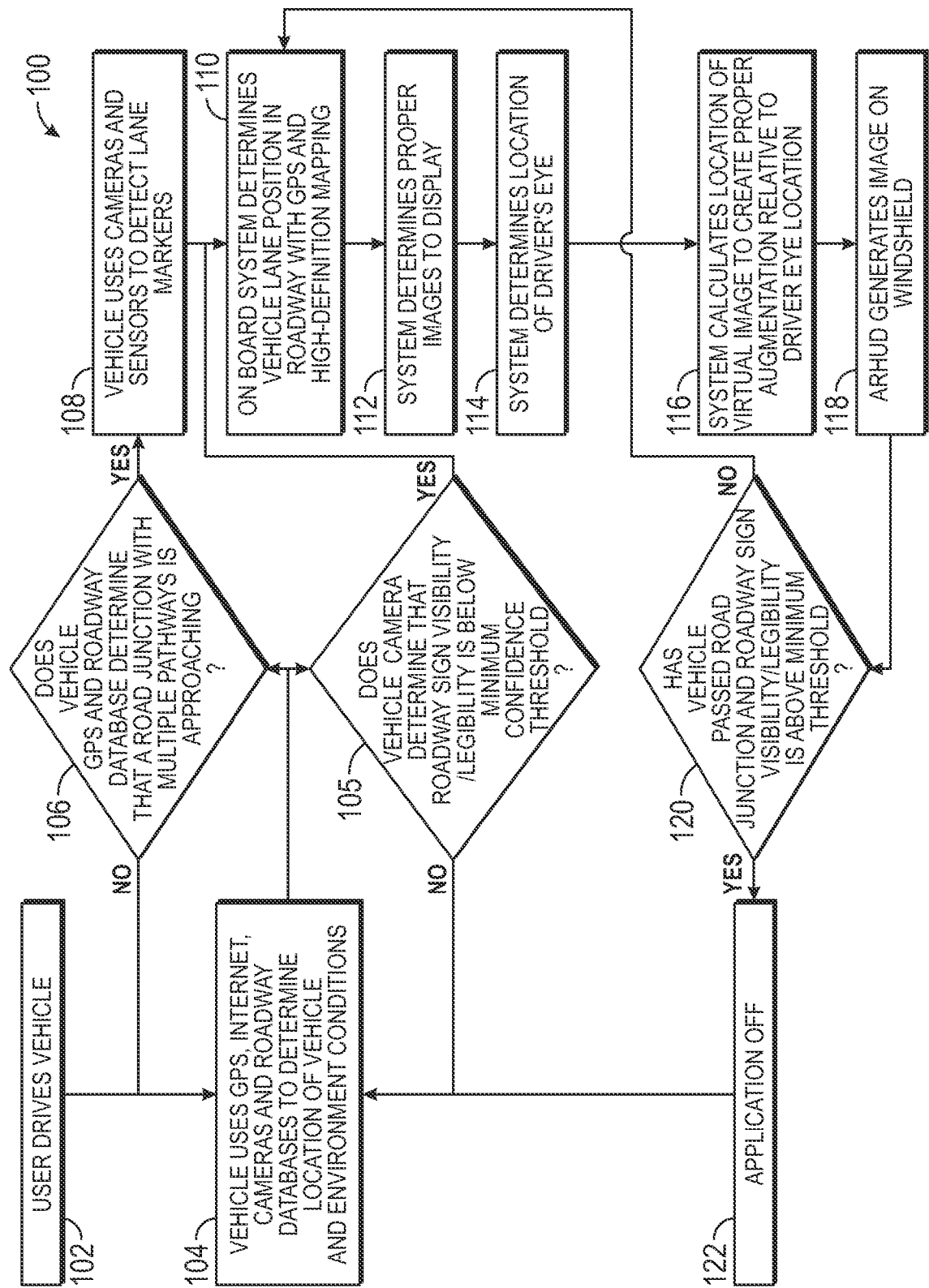
FIG. 7 is a flowchart of a method for displaying lane information on dual-focal plane augmented reality display of FIG. 1.

FIG. 7 is a flowchart of the method 100 for displaying lane information on the display 29 (e.g., an AR display). The method 100 begins at block 102, in which the controller 34 determines that the vehicle 10 is being driven using, for example, signals generated by the sensors 40. For example, the controller 34 may receive data from one of the sensors 40, such as a speed sensor, to determine that the vehicle 10 is moving. Then, the method 100 proceeds to block 104.

At block 104, the controller 34 determines the location of the vehicle 10 and the environmental driving conditions around the vehicle 10, such as weather causing poor visibility. To do so, the controller 34 may receive at least one signal from one or more sensors 40, such as cameras 41, GNSS transceivers 45 (e.g., Global Positioning System (GPS) transceivers) and/or data from the internet and roadway databases. For example, the controller 34 may receive vehicle-location data and roadway data from the GNSS transceivers 45. In the present disclosure, the term "vehicle-location data" means data that indicates the location of the vehicle 10. As used herein, the term "roadway data" means data including information about a roadway 51 (FIG. 2) along the route of the vehicle 10 and may include roadway databases. As discussed above, the roadway 51 includes a plurality of lanes 61 (FIG. 2), and the roadway data also includes lane information about at least one of the lanes 61 along the route of the vehicle 10. The lane information may include lane name or number and/or rules of that particular lane 61. Accordingly, the controller 34 may determine the location of the vehicle using, for example, the vehicle-location data received from the GNSS transceiver 45, another sensor 40, or another suitable source of information.

Also at block 104, the controller 34 determines the environmental driving conditions around the vehicle 10. To do so, the controller 34 receives images captured by the cameras 41 and/or weather data from a suitable source, such as the Internet. The images captured by the cameras 41 may include image data. The image data includes one or more images and information about the visibility of road signs 53 and the roadway 63 along the route of the vehicle 10. In FIG. 3, the road sign 53 is painted on the roadway 63 but is hidden by snow. Using the image data (e.g., images) and/or the weather data, the controller 34 determines the environmental driving conditions surrounding the vehicle 10. As a non-limiting example, the controller 34 may use the camera 41 (i.e., a front-facing camera of the vehicle 10) and weather data to determine that is snowing along the route of the vehicle 10. As used herein, the term "weather data" means data about the weather in the immediate area surrounding the vehicle 10. Next, the method 100 continues to block 106.

At block 106, the controller 34 determines whether the vehicle 10 is approaching a road junction 65 using the vehicle-location data and the roadway data. Further, at block 106, the controller 34 may additionally determine whether the vehicle 10 is approaching the road junction 65 that has at least a predetermined number of pathways (e.g., three pathways). The predetermined number of pathways may be at least three pathways. Further, the controller 34 may determine that the vehicle 10 is approaching the road junction 65 with at least the predetermined number of pathways if the vehicle 10 is located at a distance that is less than a predetermined distance threshold from the road junction 65. The predetermined distance threshold may be determined by testing the vehicle 10 and may be, for example, 5 meters. The controller 34 may determine the distance from the vehicle 10 to the road junction based on signals from one or more sensors 40. If the vehicle 10 is approaching a road junction 65 with less than the predetermined number of pathways, then the method 100 returns to block 104 to conserve processing resources. If the vehicle 10 is approaching a road junction 65 with at least the predetermined number of pathways, then the method 100 proceeds to block 108.

At block 108, the controller 34 detects lane markers 67 (FIG. 3) using one or more inputs from the camera(s) 41 and/or another sensor 40. In the present disclosure, the term "lane marker" means a marking, such as a dashed line painted on the roadway surface 62 (FIG. 3), that marks the boundaries of a lane 61 (FIG. 3). After executing block 108, the method 100 proceeds to block 110.

The method 100 also includes block 105, which is performed after block 104. At block 105, the controller 34 determines, using the image data (e.g., images), visibility (or legibility) of one or more road signs 53 (FIG. 2) along the route of the vehicle 10 is less than a predetermined minimum-confidence threshold. If the visibility (or legibility) of the road sign 53 is less than the predetermined minimum-confidence threshold, then the method 100 continues to block 110, which is described below.

At block 110, the controller 34 determines the vehicle lane position. In other words, the controller 34 determines the position of the vehicle 10 relative to the plurality of lanes 61 of the roadway 63 along the route of the vehicle 10. In doing so, the controller 34 may use the vehicle-location data received from GNSS transceiver 45, the location of the roadway markers previously detected, and/or roadway databases to determine the vehicle lane position. Stated differently, at block 110, the controller 34 determines in which lane 61 the vehicle 10 is located. Then, the method 100 continues to block 112.

At block 112, the controller 34 determines the specific virtual images 50 to be displayed on the display 29 (e.g., the dual-focal plane augmented reality display) based on the lane information, which is part of the roadway data previously received by the controller 34. As discussed above, the virtual images 50 may be indicated of the lane rules, lane name, the name of the road that the lane 61 leads to or other relevant lane information. For example, as shown in FIG. 2, the controller 34 may select virtual images 50 that indicate that the lanes 61 lead to a particular street or a particular interstate. Also, for instance, the controller 34 may select virtual images 50 that indicate lane rules with arrows. The lane rule may be that the vehicle 10 may only continue forward (i.e., it cannot turn left or right) while traveling on the central lane 54 (FIG. 3) as discussed in detail above. After executing block 112, the method 100 proceeds to block 114.

At block 114, the controller 34 determines the location of the eyes 66 and/or the head 69 of the user of the vehicle 10 using at least one input from the user tracker 43. As discussed above, the user tracker 43 may be a camera 41 configured to track the movements of the head 69 and/or the eyes 66 of the vehicle user. The controller 34 then uses the inputs from the user tracker 43 to continuously determine, in real time, the location of the eyes 66 and/or the head 69 of the user of the vehicle 10. The method 100 then proceeds to block 116.

At block 116, the controller 34 determines, in real time, the location, type, size, shape, and color of the virtual images 50 (FIG. 2) to be displayed on the display 29 (e.g., the dual-focal plane augmented reality display) based on the location of the eyes 66 and/or the head 69 of the user of the vehicle 10 and the lane information. As a non-limiting example, the location of the virtual images 50 in the display 29 may change as the user moves the head 69 and/or eyes 66. Further, the size of the virtual images 50 may increase as the vehicle 10 gets closer to the road junction 65. Next, the method 100 proceeds to block 118.

At block 118, the controller 34 transmits a command signal to command the display 29 to present the virtual images 50 at the previously determined locations. In response to receiving the command signal from the controller 34, the display 29 shows the virtual images 50 at the previously determined locations. As discussed above, the virtual images 50 include the lane information concerning one or more lanes 61 along the route of the vehicle 10 as the vehicle 10 is approaching the road junction 65. The location of the virtual images 50 may change in real time based on location of the eyes 66 and/or the head 69 of the vehicle user as well as the vehicle lane position as the vehicle 10 approaches the road junction 65. After block 118, the method 100 proceeds to block 120.

At block 120, the controller 34 determines whether the vehicle 10 has passed the road junction 65. To do so, the controller 34 uses the location of the vehicle 10, which may be obtained from the GNSS transceivers 45 (e.g., Global Positioning System (GPS) transceivers) and the roadway databases. The method 100 then proceeds to block 122.

At block 122, the method 100 ends in response to determining that the vehicle 10 has passed the road junction 65. Further, at block 120, the method 100 ends if the visibility (or legibility) of the road signs 53 is equal to or greater than the predetermined minimum-confidence threshold. At this juncture, the controller 34 commands the display 29 to stop showing the virtual images 50. In response, the display 29 stops showing the virtual images 50.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for displaying lane information on an augmented reality display, comprising:
receiving roadway data, wherein the roadway data includes information about a roadway along a route of a vehicle, and the roadway includes a plurality of lanes, and the roadway data includes lane information about at least one of the plurality of lanes along the route of the vehicle;
receiving vehicle-location data, wherein the vehicle-location data indicates a location of the vehicle;
determining that that the vehicle is approaching a road junction with at least three pathways using the vehicle-location data and the roadway data, wherein the at least three pathways are part of the plurality of lanes, the plurality of lanes include a left lane, a central lane, and a right lane, the left lane leads to a first interstate, the central lane leads to a second interstate, the left lane leads to an exit leading to a main street, and determining that the vehicle is approaching the road junction includes:
determining that the vehicle is located at a distance that is less than predetermined distance threshold from the road junction; and
in response to determining that the vehicle is approaching the road junction and that the vehicle is at located at the distance that is less than the predetermined distance threshold, transmitting a command signal to a dual-focal plane augmented reality display to display a first virtual image, a second virtual image, and a third virtual image each of which is indicative of the lane information about the at least one of the plurality of lanes along the route of the vehicle as the vehicle is approaching the road junction, wherein the first virtual image includes a number of the first interstate, the second virtual image includes a number of the second interstate, and the third virtual image includes a name of the main street.

2. The method of claim 1, further comprising identifying lane markers of the plurality of lanes, wherein the dual-focal plane augmented reality display has a first image plane and a second image plane, the first image plane shows a view of an outside world, the second image plane is reserved for displaying the first virtual image, the second virtual image, and the third virtual image, the second image plane spans the left lane, the central lane, and the right lane of the roadway, the first virtual image, the second virtual image, and the third virtual image appears at a location farther from the vehicle on a roadway surface of the roadway relative to the first image plane, the roadway includes the left lane, the central lane, and the right lane, the central lane is between the left lane and the right lane, the second image plane covers the left lane, the central lane, and the right lane, second image plane starts at a first predetermined distance from the vehicle at the central lane, the first predetermined distance is twenty-five meters, the second image plane ends at a second predetermined distance from the vehicle at the left lane, the second predetermined distance is ninety meters, the second image plane is delimited by a sloped boundary relative to the roadway surface that starts at the first predetermined distance from the vehicle at the central lane and ends at a third predetermined distance from the vehicle at the left lane, the predetermined distance threshold is five meters, the vehicle is currently located in the central lane, the left lane is directly to the left of the central lane, the right lane is directly to the right of the central lane, the third predetermined distance is fifty meters, and the first image plane and the second image plane are at different locations.

3. The method of claim 2, further comprising determining a position of the vehicle relative to the plurality of lanes of the roadway along the route, wherein the method further includes determining whether the vehicle is being driven using signals generated by a plurality of sensors of the vehicle, the method further comprising determining a weather around the vehicle, the method further comprises determining the location of the vehicle using the signal generated by the plurality of sensors of the vehicle.

4. The method of claim 3, further comprising determining image the first virtual image, the second virtual image, and the third virtual image to be displayed on the dual-focal plane augmented reality display based on the lane information.

5. The method of claim 4, further comprising determining a location of eyes of a user of the vehicle.

6. The method of claim 5, further comprising determining a location of the first virtual image, the second virtual image, and the third virtual image on the dual-focal plane augmented reality display, in real-time, based on the location of the eyes of the user of the vehicle.

7. The method of claim 6, further comprising commanding the dual-focal plane augmented reality display to display the first virtual image, the second virtual image, and the third virtual image at the location previously determined, wherein the first virtual image, the second virtual image, and the third virtual image includes the lane information of at least one of the plurality of lanes along the route of the vehicle as the vehicle is approaching the road junction.

8. The method of claim 7, further comprising determining whether the vehicle has passed the road junction, and ending the method in response to determining that the vehicle has passed the road junction.

9. The method of claim 1, further comprising:
receiving image data, wherein the image data includes information about a visibility of the roadway along the route of the vehicle;
determining that the visibility of a road sign along the route of the vehicle is less than a predetermined minimum-confidence threshold using the image data; and
in response to determining that the visibility of the road sign along the roadway of the vehicle is less than the predetermined minimum-confidence threshold, transmitting a command signal to a dual-focal plane augmented reality display to display at least one virtual image including the lane information of each of the plurality of lanes along the route of the vehicle as the vehicle is approaching the road junction.

10. A method for lane identification on an augmented reality display, comprising:
receiving roadway data, wherein the roadway data includes information about a roadway along a route of a vehicle, the roadway includes a plurality of lanes, and the roadway data includes lane information about each of the plurality of lanes along the route of the vehicle;
receiving image data, wherein the image data includes information about a visibility of the road along the route of the vehicle;
determining that a visibility of a road sign painted on the roadway along the route of the vehicle is less than a predetermined minimum-confidence threshold using the image data, wherein the road sign is indicative that one of the plurality of lanes leads to an interstate, and determining that the visibility of the road sign along the route of the vehicle is less than the predetermined minimum-confidence threshold includes determining that is snowing along the route of the vehicle;
in response to determining that the visibility of the road sign along the route of the vehicle is less than the predetermined minimum-confidence threshold and that is snowing along the route of the vehicle, transmitting a command signal to a dual-focal plane augmented reality display to display at least one virtual image including lane information of at least one of the plurality of lanes along the route of the vehicle as the vehicle is approaching a road junction;
identifying lane markers of the plurality of lanes; and
refraining from showing the at least one virtual image in response to determining that the visibility of the road sign along the route of the vehicle is equal to or greater than the predetermined minimum-confidence threshold.

11. The method of claim 10, further comprising determining a position of the vehicle relative to the plurality of lanes of the roadway along the route.

12. The method of claim 11, further comprising determining the at least one virtual image to be displayed on the dual-focal plane augmented reality display based on the lane information.

13. The method of claim 12, further comprising determining a location of eyes of a user of the vehicle.

14. The method of claim 13, further comprising determining a location of the at least one virtual image on the dual-focal plane augmented reality display based on the location of the eyes of the user of the vehicle.

15. A system for displaying lane information on an augmented reality display in a vehicle, comprising:
a plurality of sensors, wherein at least one of the plurality of the sensors is configured to collect roadway data, the roadway data includes information about a roadway along a route of the vehicle, the roadway includes a plurality of lanes, and the roadway data further includes lane information about each of the plurality of lanes along the route of the vehicle
a dual-focal plane augmented reality display;
a controller in communication with the plurality of sensors and the dual-focal plane augmented reality display, wherein the controller is configured to:
receive the roadway data from at least one of the plurality of sensors;
receive vehicle-location data from the at least one of the plurality of sensors, wherein the vehicle-location data indicates a location of the vehicle;
determine that that the vehicle is approaching a road junction with at least three pathways using the roadway data and the vehicle-location data by:
determining that the vehicle is located at a distance that is less than predetermined distance threshold from the road junction, wherein the at least three pathways are part of the plurality of lanes, the plurality of lanes include a left lane, a central lane, and a right lane, the left lane leads to a first interstate, the central lane leads to a second interstate, the left lane leads to an exit leading to a main street; and
in response to determining that the vehicle is approaching the road junction and that the vehicle is at the distance that is less than the predetermined distance threshold, transmit a command signal to a dual-focal plane augmented reality display to display a first virtual image, a second virtual image, and a third virtual image including the lane information of the plurality of lanes along the route of the vehicle as the vehicle is approaching the road junction, wherein the first virtual image includes a number of the first interstate, the second virtual image includes a number of the second interstate, and the third virtual image includes a name of the main street.

16. The system of claim 15, wherein the plurality of sensors includes a camera, and the controller is further configured to identify lane markers of the plurality of lanes based on an input from the camera, wherein the dual-focal plane augmented reality display has a first image plane and a second image plane, the first image plane shows a view of an outside world, the second image plane is reserved for displaying the first virtual image, the second virtual image, and the third virtual image, the second image plane spans the left lane, the central lane, and the right lane of the roadway, the first virtual image, the second virtual image, and the third virtual image appears at a location farther from the vehicle on a roadway surface of the roadway relative to the first image plane, the roadway includes the left lane, the central lane, and the right lane, the central lane is between the left lane and the right lane, the second image plane covers the left lane, the central lane, and the right lane, second image plane starts at a first predetermined distance from the vehicle and ends at a second predetermined distance from the vehicle, the second predetermined distance is greater than the first predetermined distance, the first predetermined distance is twenty-five meters, the second predetermined distance is ninety meters, the second image plane includes a first linear boundary arranged horizontally relative to the roadway surface, the first linear boundary is at the first predetermined distance from the vehicle, the second image plane is delimited by a sloped linear boundary relative to the roadway surface that starts at the first predetermined distance from the vehicle and ends at a third predetermined distance from the vehicle at the left lane, the sloped linear boundary is obliquely angled relative to the first linear boundary, the third predetermined distance is greater than the first predetermined distance, the third predetermined distance is greater than the second predetermined distance, the predetermined distance threshold is five meters, the second image plane includes a second linear boundary that is arranged parallel to the roadway surface, the sloped linear boundary is obliquely angled relative to the second linear boundary, the second linear boundary starts at the third predetermined distance from the vehicle and ends at the second predetermined distance from the vehicle, the vehicle is currently located in the central lane, the left lane is directly to the left of the central lane, the right lane is directly to the right of the central lane, the third predetermined distance is fifty meters, and the first image plane and the second image plane are at different locations.

17. The system of claim 16, wherein the controller is configured to determine a position of the vehicle relative to the plurality of lanes of the roadway along the route.

18. The system of claim 17, wherein the controller is further configured to determine the first virtual image, the second virtual image, and the third virtual image to be displayed on the dual-focal plane augmented reality display based on the lane information.

19. The system of claim 18, wherein the plurality of sensors includes a user tracker, the controller is further configured to determine a location of eyes of a user of the vehicle using an input from the user tracker, and the controller is configured to determine a location of the first virtual image, the second virtual image, and the third virtual image on the dual-focal plane augmented reality display based on the location of the eyes of the user of the vehicle.

* * * * *